United States Patent
Lee (12)

(10) Patent No.: US 6,237,102 B1
(45) Date of Patent: May 22, 2001

(54) METHOD AND APPARATUS FOR CONTROLLING FREQUENCY AND LENGTH OF A REST MODE IN A COMPUTER

(75) Inventor: Kyoung-won Lee, Busan (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/220,610

(22) Filed: Dec. 28, 1998

(30) Foreign Application Priority Data

Dec. 26, 1997 (KR) .................................................. 97-74466

(51) Int. Cl.⁷ ........................................................ G06F 3/00
(52) U.S. Cl. ................................................................ 713/323
(58) Field of Search ..................................... 713/320, 322, 713/323, 324, 330, 340, 300

(56) References Cited

U.S. PATENT DOCUMENTS

| | | | |
|---|---|---|---|
| 5,230,064 | * | 7/1993 | Kuo et al. . |
| 5,446,906 | | 8/1995 | Kardach et al. . |
| 5,448,262 | * | 9/1995 | Lee et al. .............................. 345/212 |
| 5,504,908 | | 4/1996 | Ikeda . |
| 5,530,878 | | 6/1996 | Bauer et al. . |
| 5,568,409 | * | 10/1996 | Neoh ................................... 713/321 |
| 5,590,340 | * | 12/1996 | Morita et al. ........................ 713/323 |
| 5,598,565 | * | 1/1997 | Reinhardt ............................. 713/323 |
| 5,675,364 | * | 10/1997 | Stedman et al. ..................... 345/211 |
| 5,692,127 | | 11/1997 | Narad et al. . |
| 5,713,029 | | 1/1998 | Kaiser et al. . |
| 5,875,327 | * | 2/1999 | Brandt et al. ........................ 395/651 |
| 5,909,382 | * | 6/1999 | Neoh ................................. 178/19.01 |
| 5,974,559 | * | 10/1999 | Bannai ................................. 713/330 |
| 6,076,169 | * | 6/2000 | Lee ...................................... 713/320 |

FOREIGN PATENT DOCUMENTS

| | | |
|---|---|---|
| 10-199 835 003 | 6/1977 | (KR) . |

\* cited by examiner

Primary Examiner—Xuan Thai
(74) Attorney, Agent, or Firm—Robert E. Bushnell, Esq.

(57) ABSTRACT

A method and apparatus for controlling a rest mode for stopping the use of a computer at preset intervals are disclosed. The method includes the steps of setting a rest mode, as a mode for stopping a predetermined operation of the computer while using the computer, by setting a rest interval for deciding a preset time interval, and a rest time for which the computer operation is stopped in every rest interval; checking whether it becomes the target time determined by the above-set rest interval; beginning the rest mode for stopping the computer operation for the above-set rest time when it is the target time; and restoring the previous operation mode when the preset rest time elapses. Therefore, bad influences by unconscious longtime use of a computer can be prevented by controlling stopping computer use at predetermined intervals during computer use.

12 Claims, 4 Drawing Sheets

METHOD AND APPARATUS FOR CONTROLLING FREQUENCY AND LENGTH OF A REST MODE IN A COMPUTER

CLAIM OF PRIORITY

This application makes reference to, incorporates the same herein, and claims all benefits accruing under 35 U.S.C. §119 from an application for Method for Controlling Rest Mode in Computer and Apparatus Therefor earlier filed in the Korean Industrial Property Office on Dec. 26, 1997 and there duly assigned Serial No. 74466/1997.

1. Field of the Invention

The present invention relates to a method for controlling a computer having a monitor, a keyboard, etc., and more particularly, to a method for controlling a rest mode for stopping the operation of a computer at preset intervals and an apparatus therefor in a computer.

2. Description of the Related Art

The prior art describes computers that can be put into a sleep mode, a doze mode, a stand-by mode and a rest mode for the purposes of saving on power consumption. For example, Narad et al U.S. Pat. No. 5,692,197 discloses a Method and Apparatus For Reducing Power Consumption in a Computer Network Without Sacrificing Performance. Narad et al is capable of independently initiating a transition into a power-conserving mode, i.e., a "sleep" state, while keeping its network interface "alive" and fully operational. Furthermore, Narad et al provides an internal timer for waking the computer system up at midnight to perform housekeeping chores such as daily tape backups. What is needed is a computer system that will go into a rest mode periodically to allow the user to rest his eyes and prevent the harmful effects of staring into a computer screen endlessly. What is needed is a user programmable rest mode where the user can select the length of each rest mode, the interval between which rest modes occur, and the option of making each rest mode mandatory or optional.

SUMMARY OF THE INVENTION

To solve the above problems, it is an objective of the present invention to provide a method for controlling a rest mode in a computer for stopping the operation of the computer temporarily when the computer is continuously used over a preset time.

It is another objective of the present invention to provide a method for controlling a rest mode in a computer for being able to set the rest mode interactively or compulsorily.

It is still another objective of the present invention to provide an apparatus for controlling a rest mode in a computer for stopping the use of the computer temporarily when the computer is continuously used over a preset time.

Accordingly, to achieve the first objective, there is provided a method of controlling a rest mode for stopping a current operation of a computer while using the computer, including the steps of: setting a rest mode by setting a rest interval for deciding a preset time interval, and a rest time for which the computer operation is stopped in every rest interval; checking whether it becomes a target time determined by the above-set rest interval; beginning the rest mode for stopping the computer operation for the above-set rest time when it is the target time; and restoring the previous operation mode executed before the rest mode when the rest time elapses after the rest mode begins.

To achieve the second objective, there is provided a method of controlling a rest mode for stopping a current operation of a computer while using the computer, including the steps of: setting a rest mode by setting a rest interval for deciding a preset time interval, and a rest time for which the computer operation is stopped in every rest interval; setting a dialog box mode which asks whether the user takes a rest or not whenever it is the target time determined by the rest interval, or a compulsory mode which always let the user rest when it is the time determined by the rest interval; checking whether it becomes the target time determined by the above-set rest interval; asking, if the dialog box mode was set as the rest mode, the user whether the rest mode may begin, and, if the user selects the rest mode, beginning the rest mode for stopping the computer operation for the rest time, or otherwise, restoring the previous operation mode; beginning, if the compulsory mode was set as the rest mode, the rest mode for stopping the computer operation for the above-set rest time; and restoring the previous operation mode executed before the rest mode when the rest time elapses after the rest mode begins.

To achieve the third objective, there is provided an apparatus for controlling a rest mode for stopping a current operation of the computer during user's computer operation, including: a screen display means for displaying information guiding for a rest mode setup; a mode setup means for being input whether the rest mode is set or not, a rest interval defining a preset time interval, and a rest time defining a rest mode period in every rest interval according to the guide information displayed on the screen display means; a timer means for calculating the time interval and rest time during the computer operation if the rest mode was set; and controlling means for stopping the current operation of the computer during the rest time in every rest interval calculated by the timer if the rest mode was set, and restoring the previous operation mode executed before the rest mode when the rest time elapses after the rest mode begins.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 6:
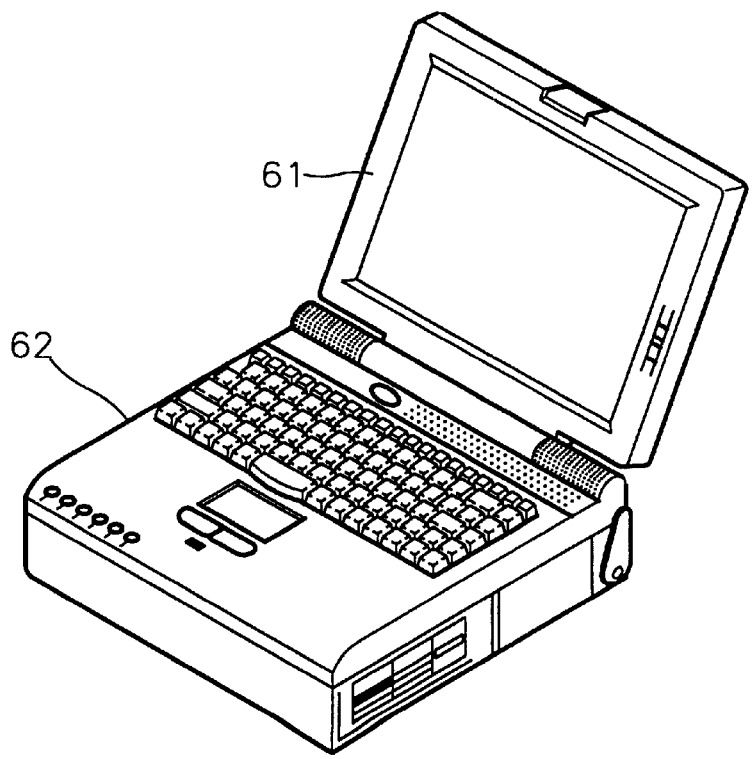
FIG. 6 is a perspective view illustrating an appearance of a general notebook computer.

FIG. 6 shows an appearance of a general notebook computer. In FIG. 6, numeral 61 denotes a monitor screen, and numeral 62 denotes a main body including a keyboard, etc. Nowadays, most of office jobs are preformed mainly by computers. Continuous use of a computer for a long time may result in dimness of one's eyes and overstrain of wrists and shoulders. However, when one indulges in doing jobs, he cannot know how long he continues to use a computer. Therefore, health of a computer user may be injured.

Figure 1:
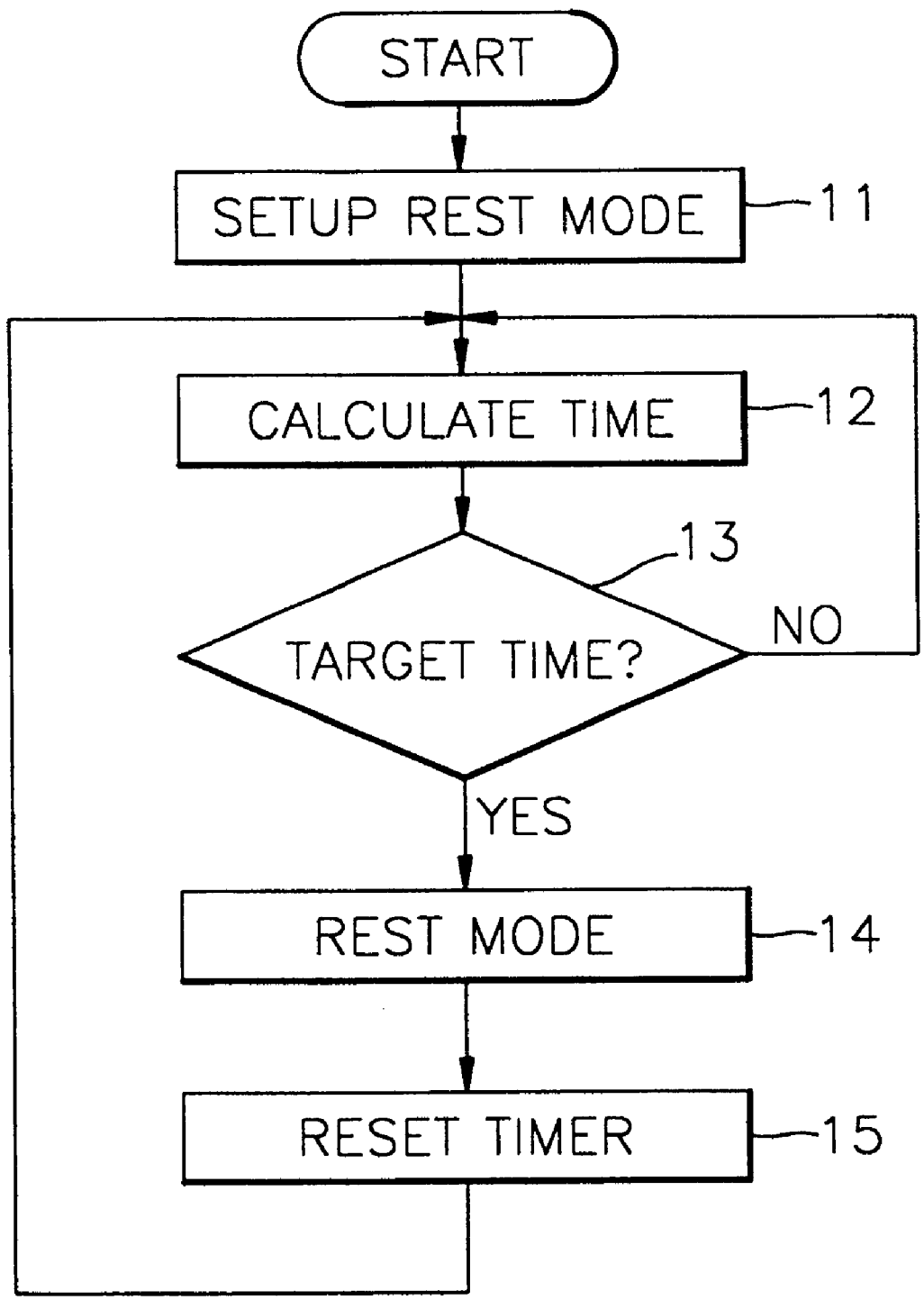
FIG. 1 is a flow chart illustrating a method for controlling a rest mode in a computer according to the present invention.

FIG. 1 shows a flow chart illustrating a method for controlling a rest mode in a computer according to the present invention. Here, the rest mode refers to a mode in which a user cannot operate the computer for a preset time by stopping a current operation of the computer while using the computer. For example, when the computer begins to be in the rest mode, the power of the computer monitor is controlled to be in an off state.

At first, the user sets whether the rest mode is to be operable or not during the computer operation in step 11. It is possible that when the computer is turned on, the rest mode is automatically set to be operable even though the user does not set the rest mode every time. After the rest mode is set, a rest interval for deciding a preset time interval, and a rest time for which the computer operation is stopped in the unit of every rest interval.

Then, whether it is a target time determined by the preset time interval is checked by calculating time with a timer during the computer operation, in step 12. When it is the target time in step 13, the rest mode in which the computer operation is stopped for the preset rest time begins in step 14, or otherwise the steps 12 and 13 are repeated.

When the preset rest time elapses after the rest mode begins, the timer is reset and the previous operation mode executed before the rest mode is restored in step 15, and then the time calculation step 12 is repeated for the next rest mode. On the other hand, if the user clicks a mouse or presses any key of a keyboard during the rest mode, the rest mode is terminated and the previous operation mode is restored.

Figure 2:
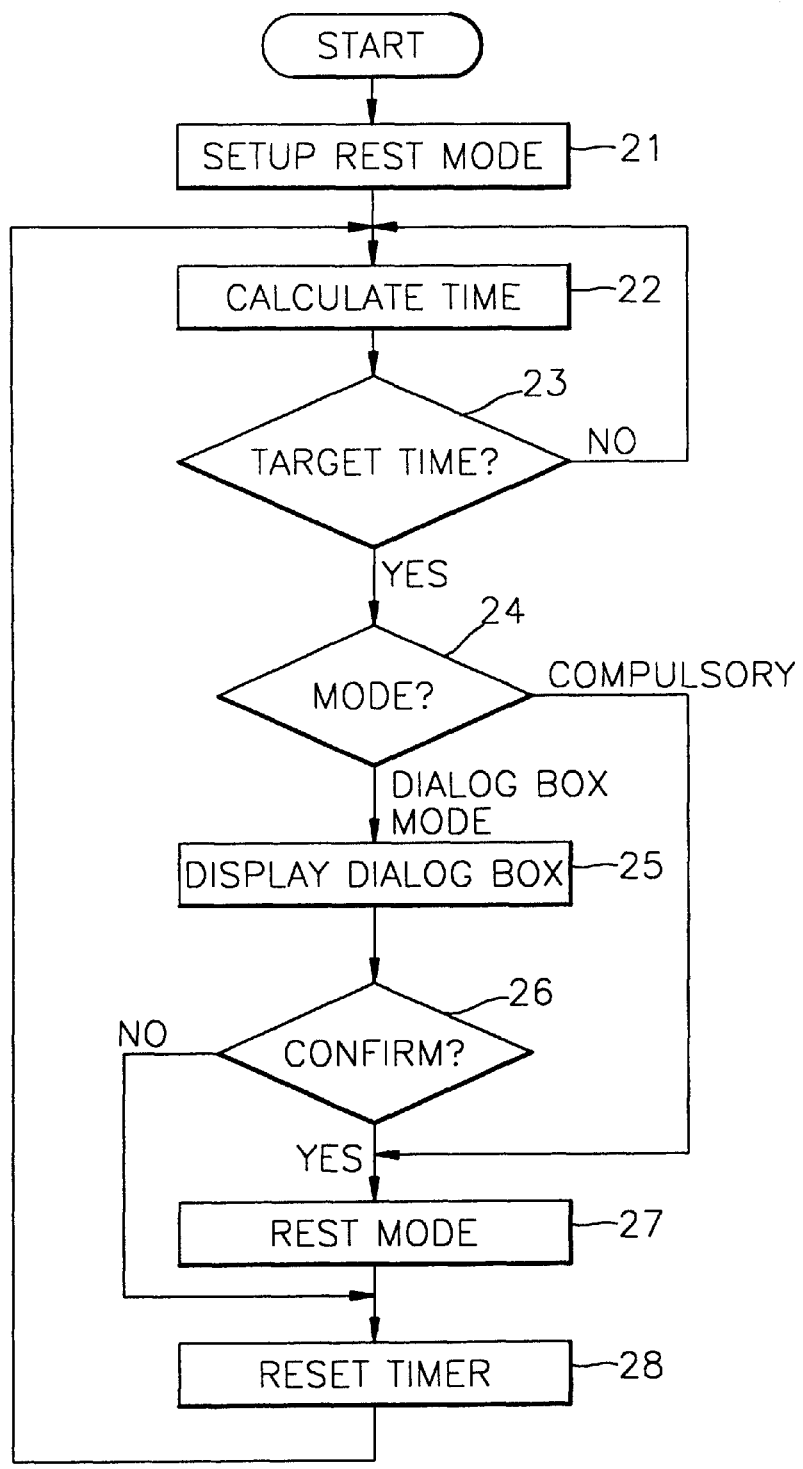
FIG. 2 is a flow chart illustrating a method for controlling a rest mode in a computer for being able to set the rest mode interactively or compulsorily according to the present invention.

FIG. 2 is a flow chart illustrating a method for controlling a rest mode in a computer for being able to set the rest mode interactively or compulsorily according to the present invention.

At first, in step 21, the user sets whether the rest mode is to be operable during the computer operation, and sets a rest interval for deciding a preset time interval, and a rest time for which the computer operation is stopped in every rest interval. Also, the user selects whether the user sets a dialog box mode which asks whether the user takes a rest or not whenever it is the target time determined by the rest interval, or a compulsory mode which always let the user rest when it is the target time determined by the rest interval.

Then, whether it is the target time is checked by calculating time with a timer during the computer operation in step 22. When it is target time in step 23, whether the dialog box mode or the compulsory mode was set as a rest mode is confirmed in step 24. On the other hand, if it is not the target time, the steps 22 and 23 are repeated.

When the dialog box mode was set as a rest mode, a dialog box is displayed in step 25, and whether the rest mode starts or not is asked to the user in step 26. When the user selects the rest mode, the rest mode in which the computer operation is stopped for the preset rest time begins in step 27, or otherwise the rest mode is canceled and the previous operation mode is restored. On the contrary, when the compulsory mode was set as a rest mode, the rest mode begins compulsorily no relation to the user's will, in step 27.

When the preset rest time elapses after the rest mode begins, the timer is reset and the previous operation mode executed before the rest mode is restored in step 28, and the time calculation step 22 is repeated for the next rest mode. On the other hand, if the user clicks a mouse or presses any key of a keyboard during the rest mode, the rest mode may be terminated and the previous operation mode may be restored.

Figure 5:
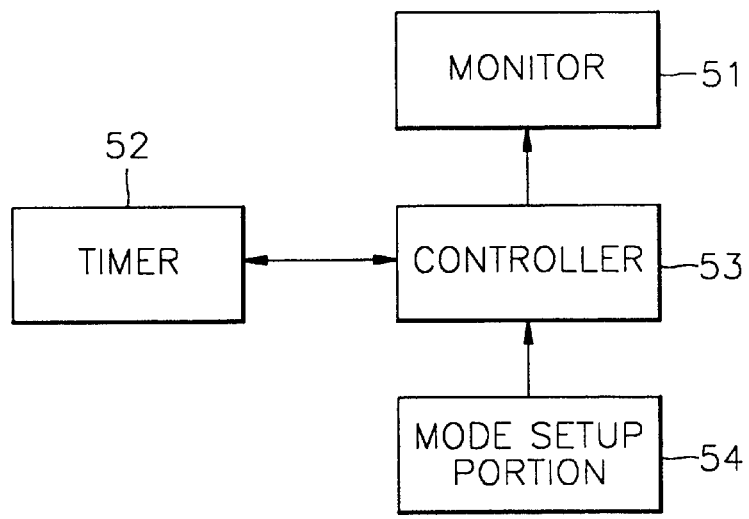
FIG. 5 is a block diagram illustrating an apparatus for controlling a rest mode in a computer according to the present invention.

FIG. 5 is a block diagram illustrating a controlling apparatus of a rest mode in a computer according to the present invention. The controlling apparatus includes a monitor 51 for displaying guiding information concerning a rest mode setup, a mode setup portion 54 for being input whether the rest mode is to be set or not, the type of the rest mode, the rest interval, and the rest time, a timer 52 for calculating time during the computer operation, and controller 53 for controlling the operation in the rest mode according to the rest mode setup data.

The monitor 51 is a screen display device for displaying guide information in order to receive inputs of rest mode setup data. According to the guide information displayed on the monitor 51, the mode setup portion 54 sets whether the rest mode for stopping a current operation of the computer during user's computer operation is to be set or not, a rest interval defining a preset time interval, and a rest time defining a rest mode period in every rest interval, and also decides whether the user sets a dialog box mode which asks whether the user takes a rest or not whenever it is the target time determined by the rest interval, or a compulsory mode which always let the user rest when it is the target time. Here, the mode setup portion 54 sets the rest interval 60 minutes and the rest time 10 minute as default values when there is no user's data input.

If the rest mode was set, the timer 52 calculates the rest interval and rest time, the controller 53 stops the current operation of the computer for the rest time in every rest interval calculated by the timer 52, and, when the preset rest time elapses after the rest mode begins, makes the previous operation mode be restored.

Also, if the dialog box mode was set as the rest mode, the controller 53 asks the user whether the rest mode may begin when it is the target time determined by the rest interval, and, if the user selects the rest mode, controls that the rest mode for stopping the computer operation for the rest time begins, or otherwise, controls that the previous operation mode is restored. On the other hand, if the compulsory mode was set as the rest mode, the controller 53 controls that the rest mode for stopping the computer operation compulsorily for the rest time begins when it is the target time determined by the rest interval. Also, after the rest mode begins and if the user clicks a mouse or presses any key of a key board even before the rest time is not ended, the controller 53 lets the rest mode terminate and the previous operation mode begin.

Figure 3:
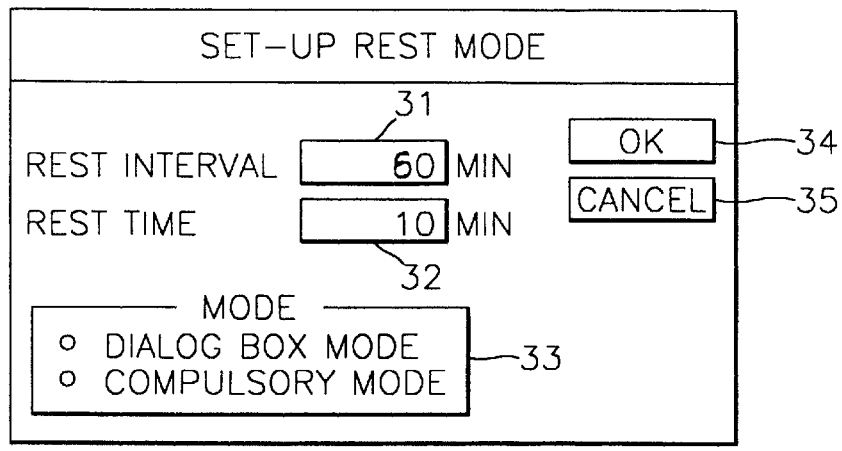
FIG. 3 is a diagram illustrating a setup screen displayed on a computer monitor in the course of setting up a rest mode in a method for controlling the rest mode and an apparatus therefor according to the present invention.

FIG. 3 is a diagram illustrating a setup screen displayed on a computer monitor in the course of setting up a rest mode in a method of controlling the rest mode and an apparatus therefor according to the present invention. Blanks for specifying a rest interval 31 and a rest time 32 and a box 33 for setting the rest mode to be a dialog box mode or a compulsory mode are displayed on the screen. In addition, provided on the screen are a OK button 34 for setting a rest mode according to input data and a CANCEL button 35 for canceling the previously input data.

Usually, it is known that it is preferable to take an about 10 minute rest when using computer for one hour. Therefore, it is preferable that the rest interval is set to 60 minutes and the rest time is set to 10 minutes, and, in particular, even though there is no user's data input, a 60 minute rest interval and a 10 minute rest time may be set as default values.

Figure 4A:
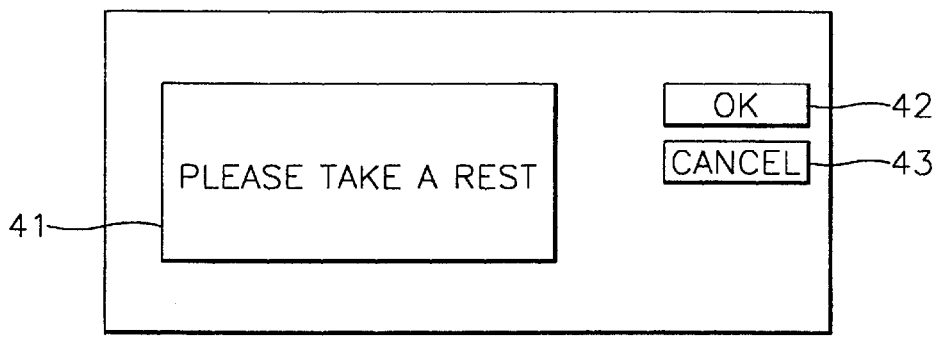
FIGS. 4a and 4b are diagrams illustrating guiding screens displayed on a computer monitor in case that a dialog box mode was set as a rest mode.
Figure 4B:
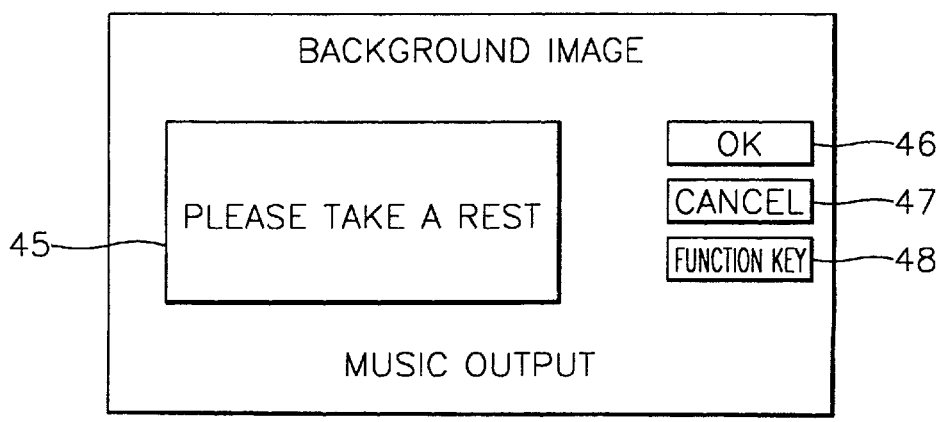

FIGS. 4a and 4b show diagrams illustrating guiding screens displayed on a computer monitor in case that a dialog box mode was set as a rest mode.

In FIG. 4a, a message 41 for indicating that it is to be a rest mode, for example, "Please take a rest." is displayed on a guiding screen. At this time, if the user presses a OK button 42, the rest mode begins, and if the user presses a CANCEL button 43, the previous operation is continued.

In FIG. 4b, a message 41 for indicating that it is to be a rest mode is displayed on the guiding screen. At this time, if the user presses a OK button 46, the rest mode begins, and if the user presses a RETURN button 47, the previous operation screen can be restored. Further, if it is necessary to operate a particularly determined function during the rest mode, a FUNCTION KEY 48 may be selected. For example, a function key for selecting a music program or an amusement program to enjoy during the rest time may be included. Also, a series of music according to the music program selected by the user or a predetermined series of music may be output through a speaker during the rest time.

As described above, with a method for controlling a rest mode and an apparatus therefor in a computer according to the present invention, bad influences by unconscious long-time use of a computer can be prevented by controlling stopping computer use at predetermined intervals during computer use.

What is claimed is:

1. A method of controlling a rest mode of a computer while using the computer, comprising the steps of:
    programming the rest mode for stopping an operation of the computer, the rest mode to occur at preset time intervals;
    programming a rest time length for which the computer operation is to remain stopped;
    checking whether a target time arrives as determined by the above preset time intervals;
    when the target time arrives, beginning the rest mode by stopping the computer operation for the programmed rest time length; and
    resuming operation of the computer when the programmed rest time length elapses.

2. The method of controlling a rest mode in a computer as claimed in claim 1, wherein the rest mode is accomplished by turning off the power to a monitor.

3. The method of controlling a rest mode in a computer as claimed in claim 1, wherein a predetermined series of music is output through a speaker in the rest mode.

4. The method of controlling a rest mode in a computer as claimed in claim 1, wherein the rest mode stops and a previous operation which was stopped is resumed when a user operates one of a mouse and a keyboard.

5. A method of controlling a rest mode of a computer while using the computer, comprising the steps of:
    programming the rest mode for stopping an operation of the computer, the rest mode to occur at preset time intervals;
    programming a rest time length for which the computer operation is to remain stopped;
    setting one of a dialog box mode and a compulsory mode, wherein the dialog box mode asks whether a user selects the rest mode so that the user is to take a rest whenever a target time is reached, said target time being determined by the above preset time intervals, and wherein the compulsory mode always lets the user rest when the target time determined by the preset time intervals is reached;
    determining whether the target time determined by the preset time intervals is reached;
    when the dialog box mode is set, determining from the user whether the rest mode is selected, and when the user selects the rest mode, beginning the rest mode by stopping the computer operation for the rest time length, and when the user does not select the rest mode, restoring a previous operation which was stopped;
    when the compulsory mode is set, beginning the rest mode by stopping the computer operation for the rest time length; and
    restoring the previous operation which was stopped by the rest mode when the rest time length elapses after the rest mode begins.

6. The method of controlling a rest mode in a computer as claimed in claim 5, wherein the rest mode is accomplished by turning off power to a monitor.

7. The method of controlling a rest mode in a computer as claimed in claim 5, wherein a predetermined series of music is output through a speaker in the rest mode.

8. The method of controlling a rest mode in a computer as claimed in claim 5, wherein the rest mode stops and the previous operation which was stopped by the rest mode is resumed when the user operates one of a mouse and a keyboard.

9. An apparatus for controlling a rest mode of a computer during operation thereof by a user, comprising:
    display means for displaying information guiding the user to program a rest mode setup;
    mode setup means for receiving input from the user as to whether or not the rest mode is set, and for selecting setting the rest mode in accordance with the input from the user, a rest interval defining a time interval between a start of consecutive rest mode periods, and a rest time defining a rest time length of the rest mode in every rest interval according to the information displayed by the display means;
    timer means responsive to setting of the rest mode for timing the rest interval and the rest time during the operation of the computer; and
    controlling means for stopping the operation of the computer when the rest mode is set and when timing of the rest time in every rest interval is carried out by the timer means, and for restoring an operation mode which was being executed by the computer before the rest mode started after the timing of the rest time by the timer means is completed.

10. The apparatus for controlling a rest mode in a computer as claimed in claim 9, wherein the mode setup means selectively sets one of a dialog box mode and a compulsory mode, wherein the dialog box mode asks whether the user selects the rest mode so that the user is to take a rest whenever it is the rest time, and wherein the compulsory mode always lets the user rest when it is the rest time as determined by the rest interval.

11. The apparatus for controlling a rest mode in a computer as claimed in claim 10, wherein the controlling means asks the user whether the rest mode is to begin when the dialog box mode is set by the mode setup means and when it is the rest time, and the apparatus sets the rest mode when the rest mode is set by the mode setting means, and the computer is restored to the operation mode which was being executed by the computer before the rest mode started when the rest mode is not set by the mode setup means, and wherein the rest mode is set automatically when the compulsory mode is set by the mode setup means and when it is the rest time as determined by the rest interval.

12. The apparatus for controlling a rest mode in a computer as claimed in claim 9, wherein the controlling means terminates the rest mode and causes the computer to resume the operation mode which was being executed by the computer before the rest mode started when the user operates one of a mouse and a keyboard even before the rest time is not ended.

* * * * *